UNITED STATES PATENT OFFICE.

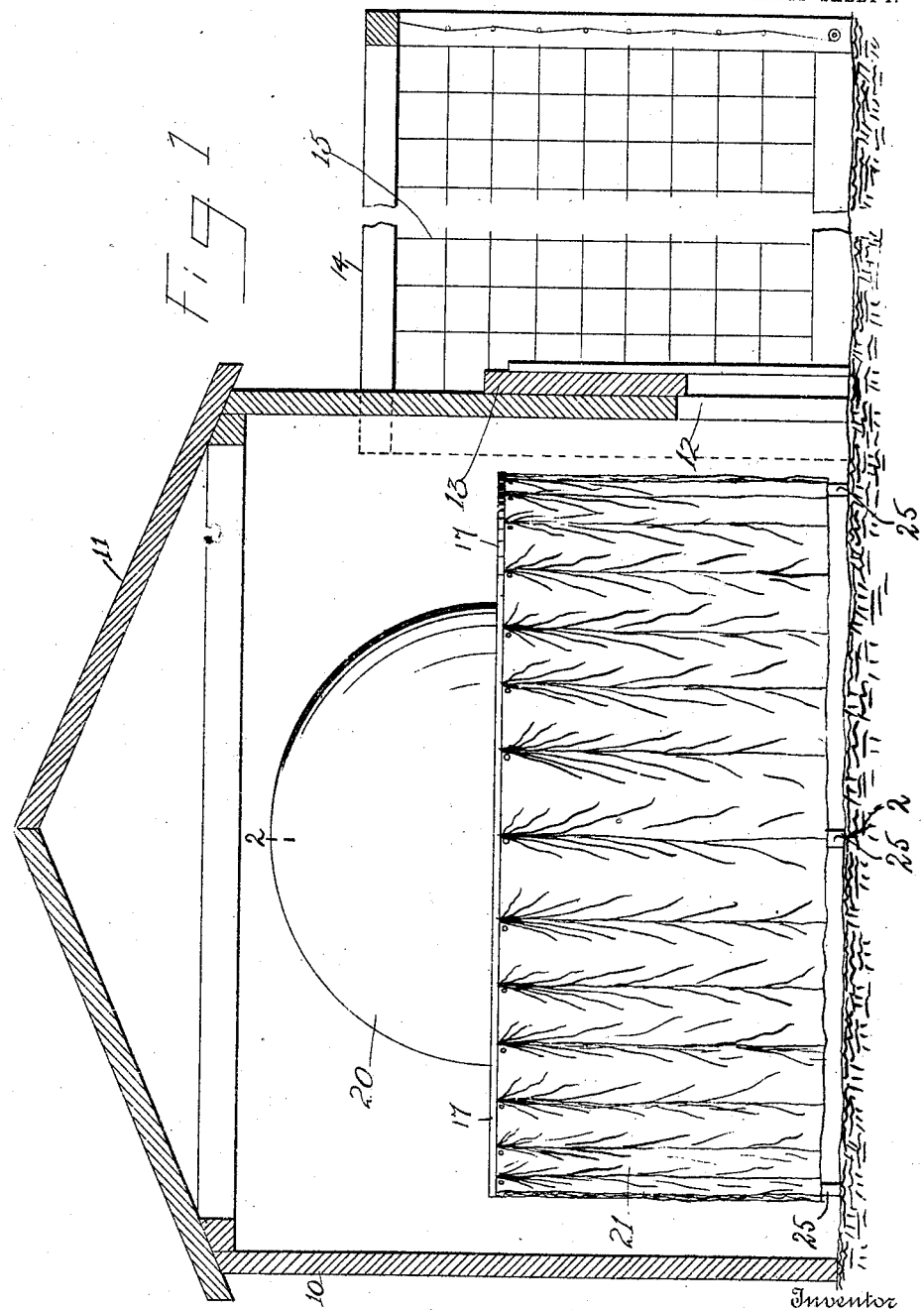

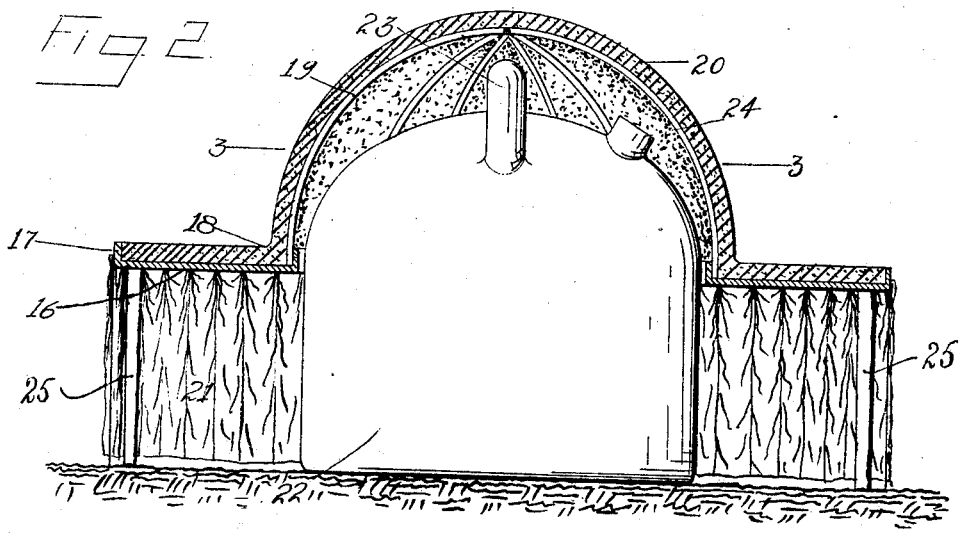
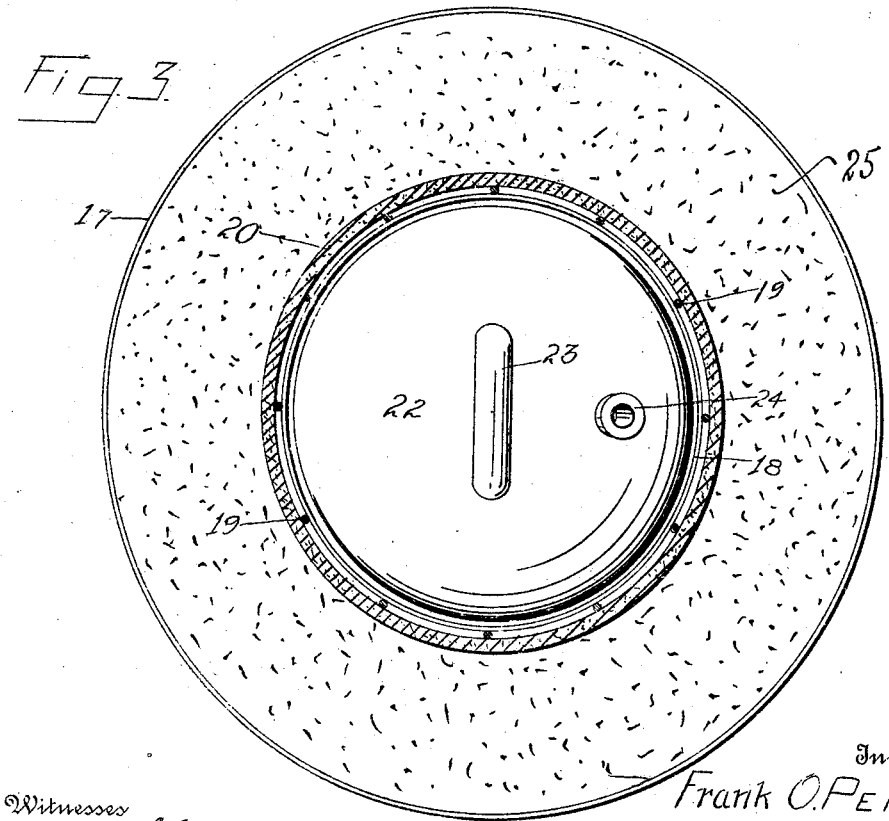

FRANK O. PENNEY, OF RICHWOOD, OHIO.

BROODER.

976,685.  Specification of Letters Patent.  Patented Nov. 22, 1910.

Application filed July 21, 1909. Serial No. 508,748.

*To all whom it may concern:*

Be it known that I, FRANK O. PENNEY, a citizen of the United States, residing at Richwood, in the county of Union, State of Ohio, have invented certain new and useful Improvements in Brooders; and I do hereby declare the following to be a full, clear, and exact description of the invention, such as will enable others skilled in the art to which it appertains to make and use the same.

This invention relates to brooders, employed in connection with incubators, and has for one of its objects to improve the construction and increase the efficiency and utility of devices of this character.

Another object of the invention is to provide a brooder having an upwardly directed dome communicating with the brooder, and providing an auxiliary air chamber in which the air is heated and caused to pass downwardly into the body of the brooder.

With these and other objects in view, the invention consists in certain novel features of construction as hereafter shown and described and then specifically pointed out in the claims, and in the drawings illustrative of the preferred embodiment of the invention, Figure 1 is a longitudinal sectional view of the improved device including the "coop" and the chicken yard, with the brooder in side elevation and located within the coop. Fig. 2 is a section of the brooder, enlarged, on the line 2—2 of Fig. 1, illustrating the interior construction. Fig. 3 is a plan view in section on the line 3—3 of Fig. 2, illustrating the construction of the dome portion of the device.

The improved device comprises in general a coop or shelter, a chicken yard communicating with the coop, a brooder including a main chamber having "hover" devices or attachments, an upwardly directed dome communicating with the brooder chamber and a heating device located within the chamber and extending into the dome. The coop portion of the device is represented as a whole at 10 and comprises an inclosure having a water proof top 11, and with a doorway 12 at one side, the doorway having a movable closure 13. Extending from the coop and connected therewith at the side which contains the doorway 12 is a chicken yard formed of a suitable frame work 14 and the usual chicken screening material 15. The chicken yard is preferably open at the top.

The brooder portion of the device comprises an annular member 16, preferably of sheet metal and with the edges upturned as shown at 17—18. Connected to the member 16 at its inner edge is a wire frame work 19 in dome-like form, and arranged over this frame work and likewise extending over the member 16 is a covering of non-conducting material, such as asbestos or the like and indicated at 20. Any suitable material may be employed for the non-conductor portion of the device, but experiment has shown that sheet asbestos operates successfully and effectually, but it will be understood that the device is not necessarily limited to any specific material for this portion of the device.

The annular member 16 is supported upon suitable legs 25, to support the annular member the desired distance above the ground. Attached to the outer rim 17 are fabric hover strips 21 of the usual form, and preferably formed from felt cut into relatively narrow strips and overlapping at their contiguous edges. The lower ends of the strips are spaced slightly from the ground or the structure on which the legs 25 rest, so as to permit free ingress or egress to the young chicks.

Located within the annular member 16 and extending into the dome-like structure 19—20 is the heating member which consists of a jug like structure 22, preferably formed of crockery-ware and preferably glazed to prevent the escape of the heating liquid. The member 22 is provided with a lifting handle 23 and with a filling tube 24, the tube preferably located at one side of the center, as shown. The member 22 is designed to contain a heating liquid, preferably water, and is less in diameter than and extends through the opening in the member 16 as shown. The structure 22 thus forms a complete circular wall within the brooder device and spaced uniformly from the hover members 21, leaving the annular space for the chicks.

The dome portion of the device thus provides a supplemental elevated heating chamber which communicates with the brooder chamber, and the upper portion of the jug 22 extending into this supplemental chamber provides for heating the air therein, and causes it to flow downwardly between the jug and the member 16 into the brooder chamber. As is well known the water in a confined vessel such as the member 22 is hottest at the top, consequently the air in the dome will be heated to a greater degree than the main chamber below, and will flow downwardly between the jug and the member 16 over the backs of the chicks, and thus provides a continuous uniform heat within the brooder chamber, and replaces the cooler air which escapes through the hover members. The dome portion and the heating element extending into the dome portion whereby the supplemental heating chamber is produced is therefore a very important feature of the improved device, and adds materially to its efficiency and utility. Another advantage of the dome feature is that a much greater bulk or quantity of the heating fluid may be contained in the brooder without materially increasing the space occupied by the heating element, as the increase of length whereby the heater extends into the dome does not necessarily increase the area occupied by the heater within the brooder chamber.

The member 22 will preferably be of relatively heavy material, to cause it to retain the heat for a greater length of time, and experiment has shown that the material employed for the manufacture of ordinary stoneware jugs is the best for the purpose, as it is not only cheap and easily manufactured, but retains the heat a relatively long period of time. The improved device may be formed of any required size or capacity, and of any suitable material.

The improved device is simple in construction, can be inexpensively manufactured of any required size or capacity, and as all the parts are separable, they can be readily cleansed or fumigated when necessary. The coop member and the chicken yard as well as the brooder member are formed without floors, so that they can be readily moved from place to place, and thus prevent any danger of infection by the accumulation of objectionable matter.

What is claimed is:—

1. A brooder comprising a chamber having an upper member provided with an opening, hover devices depending from said upper member, a dome carried by said upper member and extending over the opening thereof and wholly above the hover chamber, said dome forming an upwardly directed extension of the chamber and communicating with the same, a heater within the chamber and of less diameter than the opening of the upper member thereof and extending therethrough, and into the dome with a space between the heater and the edges of the opening, whereby an air chamber is produced between the dome and the heater and connected by a contracted annular passage with the interior of the chamber.

2. The combination in a brooder, of an upper member having hover members depending therefrom and forming a brooder chamber, said upper member having a central opening, a dome directed upwardly from the upper member and extending over the opening thereof and wholly above the hover chamber, the interior of the dome communicating through the opening with the brooder chamber, and a heating member located in the brooder and of less diameter than the opening of the upper member and extending through the same and into the dome, whereby a hot air chamber is formed between the dome and the heating chamber and communicating with the chamber by a contracted annular passage.

3. A brooder comprising a hover chamber having an upper member provided with a central opening and with upwardly directed flanges around its rim and around the opening thereof, a dome carried by the upper member and extending over the opening thereof, a cover of non-conductive material upon said upper member and retained in position by the flanges thereof, a cover of non-conductive material extending over said dome, hover members depending from said upper member, and a heating member located within the hover chamber and extending into the dome through the opening thereof.

In testimony whereof, I affix my signature, in presence of two witnesses.

FRANK O. PENNEY.

Witnesses:
 EUDORA PENNEY,
 ELLA HATHAWAY.